July 21, 1931.  A. JOSEPH  1,815,846
PROCESS AND APPARATUS FOR THE PURIFICATION OF CONTINUOUSLY
FLOWING GASES IN THE MANUFACTURE OF LIQUID FUELS
Filed May 14, 1928
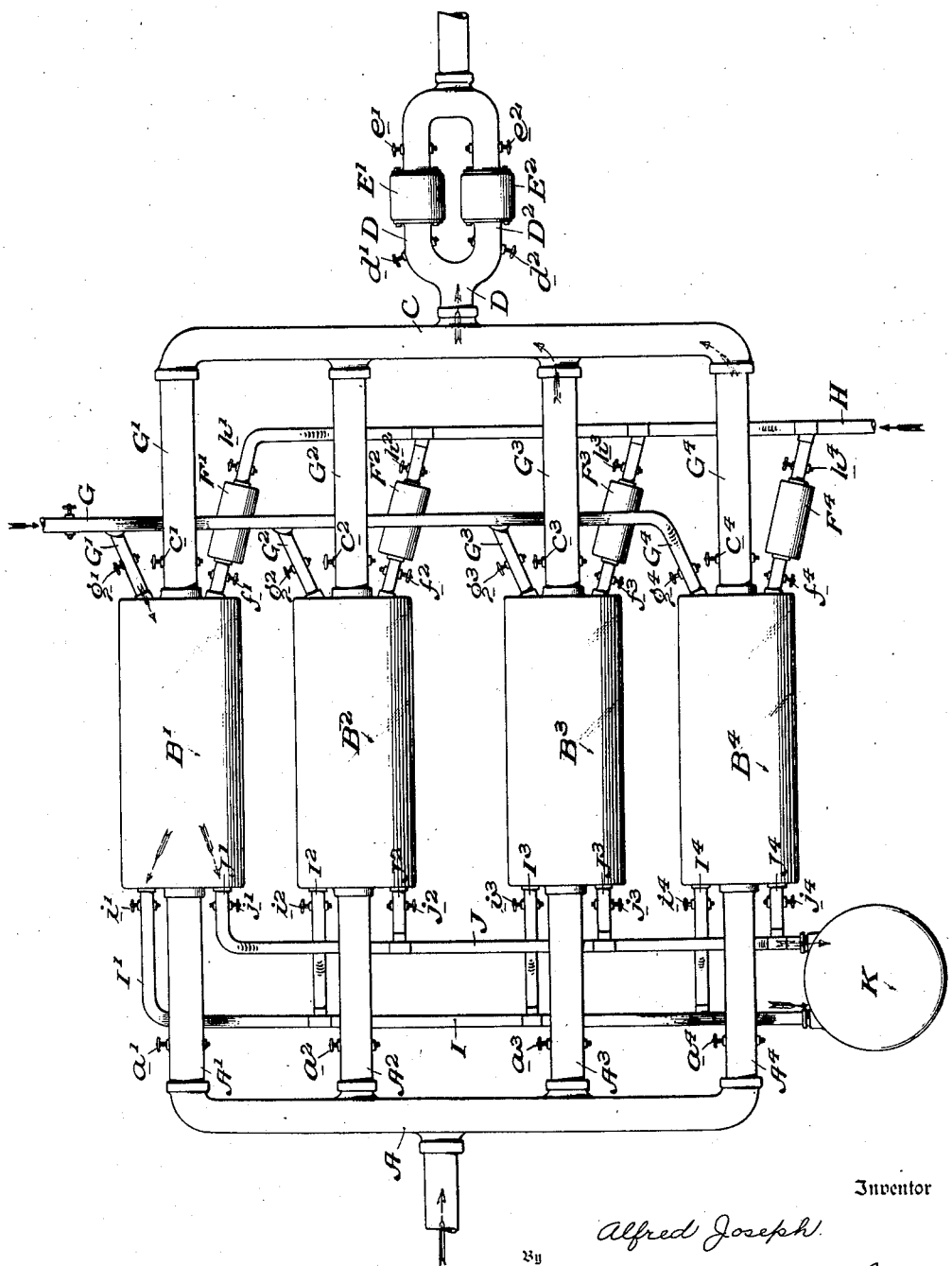
Inventor
Alfred Joseph
By Cameron, Kerkam & Sutton
Attorneys Patented July 21, 1931

1,815,846

UNITED STATES PATENT OFFICE

ALFRED JOSEPH, OF ENGHIEN, FRANCE, ASSIGNOR TO COMPAGNIE INTERNATIONALE POUR LA FABRICATION DES ESSENCES ET PETROLES, OF PARIS, FRANCE, A LIMITED JOINT-STOCK COMPANY OF FRANCE

PROCESS AND APPARATUS FOR THE PURIFICATION OF CONTINUOUSLY FLOWING GASES IN THE MANUFACTURE OF LIQUID FUELS

Application filed May 14, 1928, Serial No. 277,735, and in France August 8, 1927.

For the hot purification of gases derived from the pyrogenation, distillation, or gasification of carbonaceous materials, with a view to the elimination of sulphur compounds, the employment has already been proposed, in various forms, of metals or oxides capable of combining with the sulphur to give sulphides.

The sulphur compounds existing in the gases may be classed under two categories, one being the mineral sulphur compounds the principal of which is sulphuretted hydrogen ($H_2S$), and the other being the organic sulphur compounds of which the principals are carbon bisulphide ($CS_2$) the mercaptans ($C_2H_5SH$, etc.) and the thiophenes ($C_4H_4S$, etc.).

The sulphuretted hydrogen ($H_2S$) can be eliminated with the aid of metals or metal oxides such as nickel or the oxides of nickel, by the formation of nickel sulphides and the liberation of hydrogen, or the formation of water; the nickel sulphides formed are, in their turn, easily decomposed in order to reform nickel oxides.

As regards the organic sulphur compounds, they can be decomposed by certain metals or oxides. One part of sulphur liberated is fixed by such metals, the other part can disengage in the form of sulphuretted hydrogen, the sulphuretted hydrogen thus formed being retained as above indicated.

In the specification of U. S. patent application No. 100,462, of Eugene Albert Prudhomme, filed 7th April, 1926, there is described a process and an apparatus for the elimination of the sulphur in the operative cycle of transforming into light hydrocarbons gases derived either from a combustible or from a heavy hydrocarbon. The process consists in treating the gases in three purifying apparatuses in series wherein the first has the function of retaining almost the whole of the sulphuretted hydrogen, the second liberates, then retains a part of the sulphur contained in the organic sulphur compounds, and the third retains the sulphuretted hydrogen which may form in the second.

The regeneration of the purifiers, in industrial plants, must take place periodically at intervals of time, of the order of one or several hours, and which vary with the starting material treated.

Now, applicant has recognized that with the purifying agents the regeneration of which is easy or rapid by means of currents of air or oxygen, followed or not by currents of reducing gases, there remains in the gases, at the temperature at which the operation is effected, traces of sulphuretted hydrogen.

This phenomenon is due to the reversible reaction:

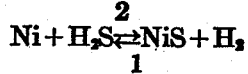

which commences to act in the direction 1 from about 225° C. in the case of nickel. However the speed of reaction is extremely small, so small that practically it is difficult to detect the $H_2S$, the volume of which is of the order of 1/10,000th of the volume of the gases leaving the purifiers.

The present invention ensures practically, in an industrial plant for the manufacture of liquid fuels, the total elimination of the sulphur, including the traces which escape in the form of sulphuretted hydrogen, from the batteries of purifiers charged with a metal reagent easy of regeneration.

According to the invention, the parallel batteries of purifiers, which with alternate periods of a duration of about one to six hours are successively in activity and then undergoing regeneration, are combined with a pair of complementary checking apparatuses, of very small capacity, located at the outlet from the purifier proper. Each of these checking apparatuses contains a metal purifying agent, such as copper for example, in a divided state and mounted on a porcelain or other carrier (pumice stone, porous earth or the like) and of which the sulphide is stable at the reaction temperature (approximately 250° C.). Each apparatus is alternately for periods of from one to three weeks put in the circuit with the remainder of the plant, whilst the associated apparatus is put out of circuit for its emptying and recharging or for its regeneration in some other manner.

As can be seen, the course of manufacture is effected in a continuous manner with periodical alternations of putting into circuit and regeneration, of the order of several hours, of the various parallel batteries of purifiers proper, and of putting in and out of circuit at much longer periods, of the other of one to several weeks, of the two small checking purifiers containing a metal reagent the sulphides of which are stable at the operative temperatures, and which are not included in the regeneration circuit. These checking purifiers may be common to the whole of the parallel batteries of purifiers proper.

The accompanying drawing shows diagrammatically a plant for the purification of gases and vapours derived from the distillation of starting materials such as lignites, peats or tars.

The invention is assumed to be applied in combination with the means which forms the subject of the applicant's U. S. patent application No. 205,817 filed 14th July 1927, for "Process for the treatment of a metallic organic or other compound, or a gas, by a gaseous reagent, serving to enter into reaction therewith" and of the French Patent No. 639,774 filed 3rd February 1927, for "Process and apparatus for the regeneration of metal oxides having served for the desulphurization of a gas or vapour", to which patent a patent of addition was annexed, filed 8th August 1927.

The gases and vapours derived from the pyrogenation, distillation or gasification of carbonaceous starting materials, after separation of certain products boiling above 400° C., are eventually led, for example by the branches $A^1$, $A^2$, $A^3$, $A^4$ of a pipe A, provided with cocks $a^1$, $a^2$, $a^3$, $a^4$, into parallel batteries of purifiers proper $B^1$, $B^2$, $B^3$, $B^4$, arranged to be alternately in activity or undergoing regeneration, the duration of the periods of activity varying, according to the nature of the starting materials, from one to six hours.

The purifiers $B^1$ and $B^2$ are for example in activity whilst in the batteries $B^3$ and $B^4$ the regeneration of the purifying agents is proceeding, by removing the sulphur and recuperating the purifying agent.

In accordance with the invention, the purified gases and vapours, before passing on to the apparatuses wherein their enrichment is effected, in the presence of catalysts, are separated from traces of sulphuretted hydrogen which they may still contain, by traversing a checking purifier of small capacity $E^1$ or $E^2$, containing a reagent such as copper for example, in the form of finely divided metal or oxide mounted on a porcelain or other carrier (pumice stone or porous earth), and giving with the sulphur a sulphide stable at the reaction temperature.

With the small quantity of $H_2S$ which passes through the outlet pipes $C^1$, $C^2$, $C^3$, $C^4$ and the collecting pipe C to the checking purifiers of which one, for instance $E^1$, is normally sufficient for the whole of the batteries $B^1$, $B^2$, $B^3$, $B^4$, the alternate periods of activity of $E^1$ and $E^2$ may be from one to six weeks according to the nature of the starting materials.

The operation of the plant illustrated by way of example, i. e. the combined plant embodying the present invention and the inventions which form the subjects of the patents cited above by the applicants, is as follows:—

The purifiers $B^1$, $B^2$ for example, charged with an oxide of nickel or other suitable oximetallic reagent, are in activity while $B^3$ and $B^4$ are undergoing regeneration. The cocks $a^1$, $a^2$, $c^1$, $c^2$ are open; $a^3$, $a^4$, $c^3$, $c^4$ are closed. The checking purifier $E^1$ for example being in service, the cocks $d^1$, $e^1$ are open; $d^2$ and $e^2$ are closed, and the checking purifier $E^2$ can be emptied and then recharged during such time.

In accordance with the invention which forms the subject of French Patent No. 639,774, mentioned above, each purifier $B^1$, $B^2$, $B^3$, $B^4$, has at its inlet end besides the pipe $A^1$, $A^2$, $A^3$, $A^4$ respectively, for the inlet of the gases and vapours to be purified, provided with its respective cock $a^1 \ldots a^4$, two outlet pipes $I^1 J^1$, $I^2 J^2$, $I^3 J^3$, $I^4 J^4$, each provided with a cock $i^1 j^1$, $i^2 j^2$, $i^3 j^3$, $i^4 j^4$ and opening into corresponding collectors I J in common connected to a vat K for the precipitation of the sulphur. These pipes serve for the evacuation of the products of the regeneration. This latter is effected as above indicated by the admission of air or of an oxidizing agent supplied by a pipe G and admitted by a pipe $G^1$, $G^2$, $G^3$, $G^4$ respectively, located at the outlet of the purifier proper, this treatment being preceded and followed by an admission of reducing gas (hydrogen or water gas for example) supplied by a pipe H and admitted by a corresponding pipe with a cock $f^1$, $f^2$, $f^3$, $f^4$ respectively, after eventually having traversed an atomic-rendering filter $F^1$, $F^2$, $F^3$, $F^4$ respectively.

When the purifiers $B^1$, $B^2$ are in activity, the cocks $i^1$, $i^2$, $j^1$, $j^2$, $f^1$, $f^2$, $g^1$, $g^2$ of the pipes other than the inlet pipes $A^1$, $A^2$ and outlet pipes $C^1$, $C^2$ are closed.

During the period of activity (of one to several hours) of the purifiers $B^1$, $B^2$, the regeneration of the oximetallic reagents in the purifiers $B^3$, $B^4$ is proceeded with. This regeneration is effected in three stages:—

1st stage: The cocks $a^3$, $a^4$, $c^3$, $c^4$ being closed, first of all the cocks $i^3$, $f^3$, $h^3$ and $i^4$, $f^4$, $h^4$ are opened.

Thus a reducing gas at a temperature of 300° C. to 400° C. is admitted by the pipe H past the cocks $h^3$ and $h^4$, at the outlet end of the apparatuses $B^3$, $B^4$, i. e. into the zone wherein the yield of sulphur is least.

At the inlet of the pipes $f^3$, $f^4$ may be provided an atomic-rendering filter $F^3$, $F^4$, i. e. a heated vessel containing a finely divided metal, nickel for example, mounted on a porcelain or other carrier which causes the hydrogen of the reducing gas to pass from the molecular or preformed state into the nascent state and thus to constitute a reaction starter.

The reducing gas, heated or not, on arriving in the zone wherein the purifying mass feebly loaded with sulphur still contains a considerable proportion of oxide, reduces the sulphides and the oxides to the metallic state, with the production of sulphuretted hydrogen and water vapour which escape by the opened pipes $I^3$, $I^4$ and passes, by the collector I, into the vat K charged with water.

This passage of gas has not only the purpose of liberating the metal, with a view to the second stage of regeneration, but also to form the $H_2S$ which, by reacting with the $SO_2$ produced in the course of the second stage, liberates the sulphur.

2nd stage: The cocks $h^3$, $f^3$, $i^3$, $h^4$, $f^4$, $i^4$ are closed and $g^3$, $g^4$, $j^3$, $j^4$ opened. Hot air or oxygen is admitted by the pipes $G^3$ and $G^4$. The metal, formed in the outlet zone oxidizes and is brought to incandescence. Thus in $B^3$ and $B^4$ are produced locally zones at an elevated temperature due to the heat disengaged by the reaction between the metal and the oxygen. The heat disengaged becomes available for starting the action of the oxygen on the sulphides present in the remainder of the apparatuses $B^3$ and $B^4$.

The sulphur dioxide and the water disengaged, pass, by the pipes $J^3$, $J^4$ and the collector J, into the vat K. On the operation being finished, the cocks $g^3$, $g^4$, $j^3$, $j^4$ are closed.

Applicant recognizes that the action of air or oxygen effects, simultaneously with the regeneration of the metal oxide purifiers, the formation of basic sulphates (NiO, $NiSO_4$ for example). If a purifier is put into service whilst containing basic sulphates, these latter would be reduced by the gases to be purified, with the disengagement of $SO_2$. The sulphur dioxide would be carried on to the catalysts where, in the presence of nickel, it would be in its turn reduced with the formation of $H_2S$ which would contaminate the catalyst.

It is therefore indispensable to destroy completely these sulphates, before re-placing the respective purifiers in service. This is the object of the third stage.

3rd stage: The reducing gases are sent through the cocks $f^3$ and $f^4$, which, as above stated, may or may not be associated with atomic-rendering filters $F^3$ and $F^4$.

The sulphur dioxide gas which forms is evacuated into the pipe J, past the cocks $j^3$ and $j^4$ left open, the cocks $g^3$ and $g^4$ being closed.

Whilst the regeneration is being effected in $B^3$ and $B^4$, the purifying agents, in fulfilling their role in the apparatuses $B^1$ and $B^2$ are becoming sulphuretted. The traces of $H_2S$ retained by the gases and vapours are eliminated by the metal of the checking purifier $E^1$.

At the appropriate time by manipulating the appropriate cocks, the apparatuses $B^3$, $B^4$ can be placed in the purifying circuit, whilst regeneration is proceeded with in the apparatuses $B^1$, $B^2$.

Whereas these alternations are effected over periods of several hours variable according to the starting materials treated, the placing out of circuit of the checking purifier $E^1$ and into circuit of the purifier $E^2$ is effected only over periods variable from one to several weeks.

The copper sulphide or other sulphide which is produced in these checking apparatuses of very small capacity may be treated by any known method for the regeneration of the metal.

It is obvious that the checking apparatuses of small capacity and of which the periods in and out of circuit are considerably longer than those of the purifiers proper, may be employed in combination with any purifier proper other than those arranged to be regenerated by the applicants' methods which have just been indicated. Likewise the purifiers proper $B^1$, $B^2$, $B^3$, $B^4$ may, instead of being each constituted as a single vessel as in the illustrated example, comprise, according to the above mentioned U. S. patent application No. 100,462, three vessels connected in series, the leading vessel being more particularly intended to retain the mineral sulphur, the following vessel the liberation and retention of the organic sulphur and the third the retention of the sulphur of the $H_2S$ which is reformed in the course of the fixation of the organic sulphur. Obviously, the pipes ($I^1$, $J^1$, $I^2$, $J^2$, $I^3$, $J^3$, $I^4$, $J^4$) would have to be connected to the leading vessel, and the pipes ($F^1$, $G^1$, $F^2$, $G^2$, $F^3$, $G^3$, $F^4$, $G^4$) to the final vessel.

The checking purifiers may be arranged with a view to rapid dismounting and remounting, or in a manner to be emptied and recharged in situ, or obviously even in such a manner that the copper sulphide can be treated in situ for the regeneration of the metal.

Instead of two separate collectors I J there could be in the plant described only one provided, furnished at the inlet end of each of the purifying apparatuses proper, with a single pipe for the outlet of both the $H_2S$ and the $SO_2$.

Claims:

1. A process for treating gases which consists in removing sulphur compounds therefrom by means of purifying material with formation of hydrogen sulphide, then removing the greater part of the remaining sulphur by means of a purifying material adapted to form sulphur compounds partially unstable at the reaction temperature, and then removing traces of sulphur remaining in the gases by means of a purifying agent forming a sulphur compound which is stable at the reaction temperature.

2. A process for treating gases which consists in removing sulphur compounds therefrom by means of a purifying material with formation of hydrogen sulphide, then removing the greater part of the remaining sulphur by means of nickel-containing substances adapted to form compounds with the sulphur at reaction temperatures not less than substantially 225°, and then removing traces of sulphur remaining in the gases by means of a purifying agent forming a compound with the sulphur that is stable above 225°.

3. A process for the continuous purification of gases which consists in purifying said gases by means of purifying agents successively retaining the inorganic and organic sulphur with formation of hydrogen sulphide and then forming sulphides with the greater portion of the remaining sulphur in said gases that are unstable at the reaction temperature, effecting said purifying operation in one purifying apparatus while regenerating the purifying agents in another purifying apparatus and alternating said apparatus, and complementarily purifying the gases by means of a purifying agent capable of forming a sulphide that is stable at the reaction temperature.

4. A process for the continuous purification of gases which consists in purifying said gases by means of purifying materials successively retaining the inorganic and organic sulphur with formation of hydrogen sulphide and then forming sulphides with the greater portion of the remaining sulphur in said gases that are unstable at the reaction temperature, effecting the purifying operation in one purifying apparatus while regenerating the purifying materials in another purifying apparatus and alternating said apparatus, complementarily purifying said gases by means of a purifying agent capable of forming a sulphide that is stable at the reaction temperature, and effecting the complementary purifying operation continuously in alternate apparatus.

5. A process for the continuous purification of gases which consists in purifying said gases at reaction temperatures not less than substantially 225° by means of purifying materials retaining the inorganic and organic sulphur with formation of hydrogen sulphide and then by means of nickel-containing substances forming sulphides with the greater portion of the remaining sulphur in said gases, effecting the purifying operation in one apparatus while regenerating the purifying materials in another purifying apparatus and alternating said apparatus, complementarily purifying said gases by means of a purifying material capable of forming a sulphide that is stable above 225°, and effecting the complementary purification continuously in alternate apparatus.

6. In a process for purifying gases, the steps of passing the gases through a purifying apparatus containing purifying materials which retain the inorganic and organic sulphur with formation of hydrogen sulphide and containing nickel which retains the greater portion of the remaining sulphur in said gases, effecting the purifying operation in one apparatus while regenerating another apparatus and alternating said apparatus at relatively short intervals, the reaction temperatures in said apparatus being not less than substantially 225°, then passing said gases through a complementary purifying apparatus containing a purifying material which retains all remaining traces of sulphur in said gases and forms a compound therewith which is stable at the reaction temperature, effecting said complementary purification in one purifying apparatus while regenerating another complementary purifying apparatus, and alternating said complementary purifying apparatus at relatively long intervals.

7. In an apparatus for purifying gases in the manufacture of liquid fuels, the combination of a plurality of purifying elements, an inlet pipe for each of said elements for gases to be purified, an outlet pipe for each of said elements for purified gases, inlet and outlet valves for said pipes, a common delivery pipe connected to each of said inlet pipes, a common discharge pipe connected to each of said outlet pipes, a pair of pipes connected to the outlet end of each of said elements, a pair of pipes connected to the inlet end of said elements for discharging waste regenerating gases therefrom, valves in each of said pipes for delivering and discharging regenerating gases, a pair of checking purifying elements, inlet pipes for each of said checking purifying elements connected to said common discharge pipe for purified gases, an outlet pipe for each of said checking purifying elements, valves for each of said inlet and outlet pipes for said checking and purifying element, and a common discharge pipe connected to each of said outlet pipes for said checking purifying elements.

In testimony whereof I have signed this specification.

ALFRED JOSEPH.